July 14, 1959   H. E. SOLAND   2,894,395
APPARATUS FOR PRODUCING A NEGATIVE ELASTIC RESTRAINT
Filed March 26, 1956

CW ROTOR ROTATION

CCW ROTOR ROTATION

*INVENTOR.*
HUBERT E. SOLAND
BY Roger W. Jensen
*ATTORNEY*

2,894,395

APPARATUS FOR PRODUCING A NEGATIVE ELASTIC RESTRAINT

Hubert E. Soland, Hopkins, Minn., assignor to Minneapolis-Honeywell Regulator Company, Minneapolis, Minn., a corporation of Delaware Application March 26, 1956, Serial No. 573,956

7 Claims. (Cl. 74—5.6)

This invention pertains to apparatus for producing a negative elastic restraint. An elastic restraint is a force proportional to the displacement of a movable member away from its normal, neutral or null position. An elastic restraint is defined as being positive when the restraining force tends to return the member to its neutral or null position. An elastic restraint is defined as being negative when the force tends to increase the displacement of the member from its null or neutral position.

The present invention has particular application in connection with a sensitive instrument such as a floated gyro which, as is known in the art, is a gyroscopic device having the spin motor enclosed in a gimbal structure which is hermetically sealed and floated in a heavy viscous fluid, the degree of floatation being such that substantially all of the weight of the gimbal assembly is supported by the fluid and hence very little weight is supported by the bearings for the gimbal structure. The bearings therefore may be very delicate and frictionless which imparts a high degree of accuracy and sensitivity to the device. In the usual floated gyro the spin motor is electrically energized which requires some sort of flexible electrical connections between the gimbal assembly and the relatively stationary housing. The gimbal assembly is restricted by stops or the like which limit its angular movement about the output axis which permits the use of flexible leads rather than the use of slip-rings or the like which would have to be used if unlimited gimbal displacement about the output axis were permitted. The flexible connection means between the relatively stationary housing and the gimbal assembly impart a certain positive elastic restraint to the movement of the gimbal assembly relative to the base. By this is meant that the flex leads tend to return the gimbal assembly to its null or neutral position. This is a source of error in a floated gyroscope and is minimized by making the flex leads as delicate as possible so as to offer the minimum restraint. Nevertheless they do offer a finite positive elastic restraint.

At the present time most floated gyroscopes comprise in part an inductive pickoff for sensing displacement between the housing and the gimbal assembly. The pickoffs may well be of the type known as microsyns shown in the Mueller Patent 2,488,734 which comprise in part a stator member having a plurality of pole pieces inwardly extending from a circular yoke portion, each pole having a primary and secondary winding thereupon. The primary windings are connected to an alternating current voltage and the secondary windings are adapted to be connected to load devices which respond to the signals generated in the secondary windings, the signals being alternating current voltages proportional in phase and in magnitude to the relative displacement between the gimbal structure and the housing. The microsyn signal generators also include an armature member which is positioned between the inwardly extending pole faces of the stator member and which is adapted to be rotated with respect to the stator by being mounted on the gimbal assembly so as to rotate therewith. When the gimbal assembly is at its null position the position of the armature with respect to the stator is such that no signal voltage is induced or generated in the secondary windings of the pickoff. However, when there is relative movement between the gimbal assembly and the housing so as to cause the rotor to move relative to the stator of the pickoff an alternating current voltage of one phase or the other relative to the primary voltage is induced or generated in the secondary windings which causes, assuming that the secondary windings are connected to some load device, a secondary current to flow. The secondary current flowing as a result of gimbal deflection reacts with the current flowing in the primary windings of the signal generator and sets up a torque in accordance to the fundamental torque equation of any inductive pickoff of the microsyn or equivalent type. The fundamental torque equation is:

$$T = K I_p I_s \cos \theta$$

where:

K is the torque sensitivity ($S_t$) in dyne-cm./ma.$^2$
$I_p$ is the primary excitation current in ma.
$I_s$ is the secondary current in ma.
$\theta$ is the phase angle between $I_p$ and $I_s$.

The present invention concerns the modification of the load circuit of the secondary winding of the signal generator in a manner not done in prior applications so as to cause the torque produced by the interaction between the secondary current and the primary current $I_s$ and $I_p$ to be a negative elastic restraint rather than a positive elastic restraint as has been the case heretofore. In other words, as far as is known, all prior art applications of sensitive instruments such as floated gyros including an inductive pickoff of the microsyn type or the equivalent have the secondary windings thereof loaded either resistively or inductively or combinations thereof. The present invention proposes the use of a capacitor to load the secondary winding of the signal generators in such a way so as to produce a phase angle between the primary current and secondary current of such a magnitude that it will produce a negative torque so as to cancel out the positive elastic restraint caused by the flex leads. Thus, in the prior art devices the torque produced by the signal generators was a positive elastic restraint that added to the positive elastic restraint caused by the flex leads. The present invention not only eliminates the positive elastic restraint caused by the signal generator but also can compensate for the positive elastic restraint of the flex leads.

It is an object of the invention, therefore, to provide an improved sensitive instrument comprising in part an inductive pickoff having a primary and secondary winding.

A broader object of the invention is to provide an improved apparatus for producing a negative elastic restraint.

Other objects of the invention will be set forth more fully in and become apparent from a reading of the following specification and appended claims, in conjunction with the accompanying drawing in which:

Figure 1:
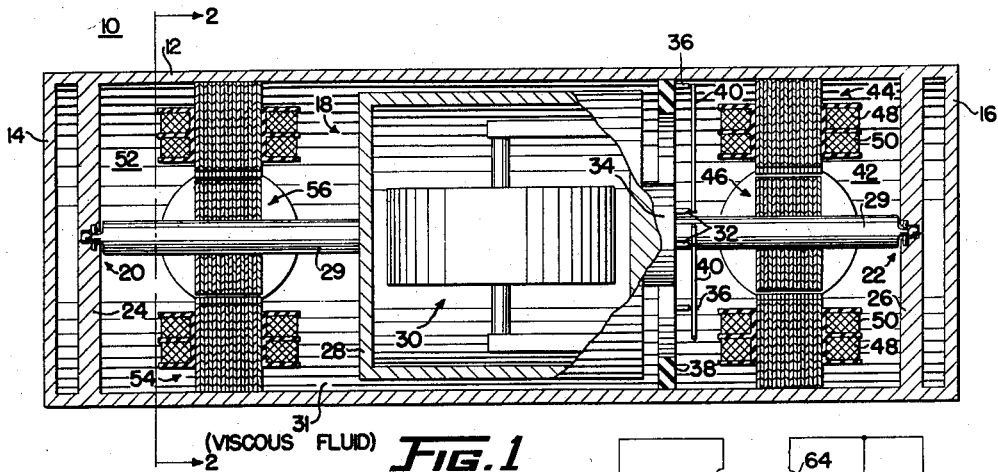
Figure 1 is a cross sectional, partially schematic, view of a floated gyroscope.

Referring to Figure 1, the number 10 designates a sensitive instrument which may be more specifically identified as a floated gyroscope comprising a hollow cylindrical housing 12 closed off at each end by end portions 14 and 16. A gimbal assembly 18 is supported by a pair of shafts 29 within housing 12 for rotation about an output axis, said output axis being defined by a pair of combination jewel and thrust bearings 20 and 22 which are positioned in a pair of internal support portions 24 and 26 of housing 12 which are adjacent respectively to end portions 14 and 16. Gimbal assembly 18 comprises a hollow cylindrical hermetically sealed enclosure 28 floated by a viscous fluid 31 contained within housing 12 and enclosing a spin motor identified by numeral 30 adapted to be rotated at high speed by electrical winding means, not shown, about a spin axis which is at right angles to the output axis, above defined. Electrical energization of spin motor 30 is accomplished through flexible connection means between the gimbal assembly 18 and the housing 12. A plurality of connection pins 32 are insulatively mounted in a header portion 34 of the gimbal assembly 18 and a second plurality of connection pins 36 are insulatively mounted in an annular ring member 38 secured to housing 12. A plurality of circular flexible leads 40 are connected between selected ones of connection pins 32 and 36. It will be understood that connection pins 36 are in turn connected to other electrical means, not shown, so that ultimately electrical power may be applied to the spin motor 30 to cause its rotor to rotate about its spin axis. For additional information on flexible leads used for establishing connection between the housing and gimbal assembly of a sensitive instrument such as a floated gyroscope, reference may be made to a copending application of Charles R. Bonnell, Serial No. 513,183, filed January 28, 1955 now Patent No. 2,859,625.

A torque generator 42 is positioned between gimbal assembly 18 and portion 26 of housing 12 and comprises a stator member 44 mounted in housing 12 and an armature or rotor member 46 mounted on shaft 29 of gimbal assembly 18 so as to rotate therewith. Primary and secondary windings 48 and 50 are provided on stator member 44 of the torque generator 42 and, as is well known by those skilled in the art, proper energization of windings 48 and 50 result in torques being produced on rotor 46 which ultimately cause the gimbal assembly 18 to rotate in one direction or the other about its output axis.

Figure 2:
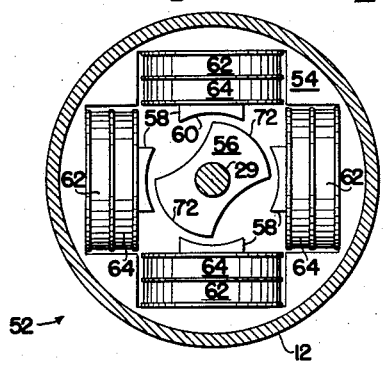
Figure 2 is a view of the inductive pickoff used to sense relative rotation between the gimbal assembly and the housing of the floated gyroscope as viewed along section lines 2—2 of Figure 1.
Figure 3:
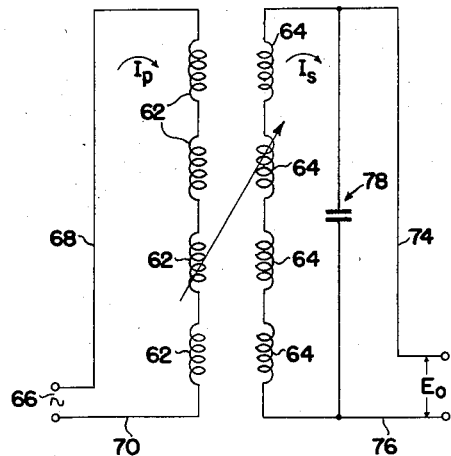
Figure 3 is an electrical schematic diagram of the inductive pickoff.

A signal generator 52 is mounted between gimbal assembly 18 and portion 24 of housing 12 and comprises a stator member 54 and an armature or rotor member 56, rotor 56 being mounted on shaft 29 of the gimbal assembly 18 so as to rotate therewith. As can be better seen in Figure 2 stator member 54 includes a circular yoke portion with a plurality of inwardly extending pole pieces 58, each pole 58 having an arcuate pole face 60 thereon. A primary winding 62 and a secondary winding 64 are mounted on each of the poles 58. One method of connecting the primary windings is shown in Figure 3 wherein the primary windings 62 are all connected in series, the series combination being connected to a suitable source of alternating current voltage 66 through connection leads 68 and 70. The application of voltage 66 to the series combination of primary windings 62 causes a primary current designated as $I_p$ to flow through the windings. As will be noted in Figure 2, the rotor member 56 of signal generaltor 52 has a pair of arcuate pole faces 72 which are normally, that is, when the gimbal assembly 18 is at its null or neutral position, equidistant between the poles 58 of stator 54, and, as is well understood by those skilled in the art, under this condition no net voltage will be induced in the secondary windings 64 when they are connected in their usual manner. One of the usual modes of connection is shown in Figure 3 wherein the secondary windings 64 are connected in series, the series combination of secondary windings 64 being adapted to be connected to some suitable load device, not shown, by connection leads 74 and 76. Thus, when rotor 56 is in its null or neutral position corresponding to the null or neutral position of the gimbal assembly 18 relative to the housing 12 there is no net voltage induced in the secondary windings 64. When rotor 56 is displaced in one direction away from its null position there will be a net secondary voltage $E_s$ induced or generated in the secondary winding 64 while when rotor 56 rotates in the opposite direction there will be a secondary voltage $E_s$ of the opposite phase induced or generated in the secondary winding 64, the phase of the secondary voltage being dependent upon the sense of deviation of the rotor relative to the stator of the signal generator 52 and the magnitude of the induced or generated voltage being dependent upon the magnitude of the deviation away from the null or normal position.

Figure 4:
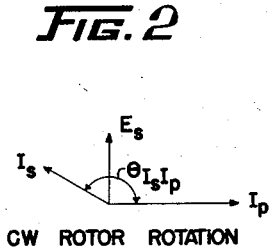
Figure 4 is a vector diagram showing the relationship between primary and secondary current for one direction of rotation of the gimbal relative to the housing.
Figure 5:
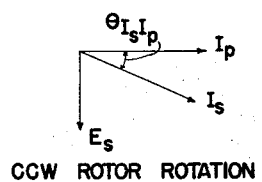
Figure 5 is a vector diagram showing the relationship between primary and secondary current for the opposite direction of movement between the gimbal and the housing.

In Figures 4 and 5 are shown vector diagrams of the secondary voltage $E_s$ and the primary and secondary currents $I_p$ and $I_s$, respectively. In both diagrams the primary current $I_p$ is used as a reference and it will be noted that the secondary voltage $E_s$ either leads the primary current $I_p$ by 90° as shown in Figure 4 or lags the primary current by 90° as is shown in Figure 5. This corresponds to the rotor 56 rotating both directions away from its null or normal position. Thus the relationship shown in Figure 4 may be taken for a clockwise rotation of rotor 56 relative to stator 54 as shown in Figure 2 and the vector relationship shown in Figure 5 may be taken for a counterclockwise rotation of rotor 56 with respect to stator 54 as shown in Figure 2. The vector diagrams, Figures 4 and 5, agree with the statement made above to the effect that for one direction of rotor rotation the secondary voltage leads the primary current by 90° and for the other direction of rotation lags the primary current by 90°. Thus in Figure 4 $E_s$ leads $I_p$ by 90° and in Figure 5 $E_s$ lags $I_p$ by 90°. In both Figures 4 and 5 it will be noted that the secondary current $I_s$ leads the secondary voltage $E_s$ by an appreciable amount but less than 90°. This relationship is obtained by connecting a capacitor 78 across the series combination of secondary winding 64. The value of the capacitor 78 is selected so that it will produce a sufficient lead of secondary current relative to secondary voltage so that the desired end result will be produced which is namely the production of a negative elastic restraint which will cancel out the positive elastic restraint caused by the flex leads 40 acting upon the gimbal assembly 18.

As an example, for an inductive signal generator having its primary winding energized with a 400 cycle alternating current voltage, and a secondary winding inductance of 1.6 henries and a resistance of 1810 ohms and connected to a high impedance load of the order of 1 megohm or more, it was found that a capacitor of approximately 0.006 microfarad produced sufficient negative elastic restraint to neutralize the positive elastic restraint of the flex leads.

*Operation*

To explain the operation of the invention; first, a clockwise rotation of rotor 56 as viewed in Figure 2 may be assumed. The positive elastic restraint imposed upon the gimbal assembly 18 by the flex leads 40 will therefore tend to return the rotor 56 to its null or neutral position and hence the positive restraint will act in a counterclockwise direction. However, for this sense of displacement of rotor 56 relative to the stator 54 the relationship between the primary current $I_p$ and secondary current $I_s$ is shown in Figure 4 where it will be noted that $I_s$ lies in the second quadrant, the primary current $I_p$ being the reference in the vector diagram. Therefore, referring to the torque equation described above it will be noted that the torque produced is a function of the cosine of the angle between the primary current $I_p$ and the secondary current $I_s$ and since the secondary current lies in the second quadrant, it follows that the cosine of this angle is a negative function and hence the torque produced will be a negative torque. Since a positive torque produced by the flex leads was defined as producing a counterclockwise movement of the rotor 56 relative to the stator 54 it follows that the negative torque produced by the capacitive loading of the secondary windings 64 will tend to make the rotor 56 go further in a clockwise direction. By proper selection of the value of capacitor 78 the negative elastic restraint produced by it will cancel out the positive elastic restraint caused by the flex leads 40.

Assume that rotor 56 is caused to rotate in a counter-clockwise direction as shown in Figure 2 in response to relative movement between gimbal assembly 18 and housing 12, said movement being either caused through gyroscopic precession or due to the action of torque generator 42 upon the gimbal assembly 18. If rotor 56 is moved in a counterclockwise direction as shown in Figure 2 the flex leads 40 will tend to return it to its null or neutral position, the positive elastic restraint caused by the flex leads in this case being in a clockwise direction. The relationship between the primary and secondary currents for this sense of rotor deviation is shown in Figure 5 and it will be noted here that the secondary current now lies in the fourth quadrant where the cosine of angles is a positive function. Therefore, the torque produced as a result of the interaction between the primary current and the secondary current will be a positive torque which will cause the rotor to be moved further in a counterclockwise direction or in effect producing a negative elastic restraint opposing the positive elastic restraint imparted to the gimbal assembly by the flex leads 40.

As mentioned above, the secondary voltage induced varies in sense with the sense of deviation of the rotor relative to the stator of the signal generator and the magnitude of the secondary voltage is a function of the magnitude of the deviation. It follows therefore that the secondary current will also vary in magnitude with the magnitude of the deviation and a reference to the torque equation will show therefore that the torque produced by the interaction between the primary current and the secondary current will also be proportional to the magnitude of the deviation. The torque therefore produced is a true restraint since it increases with the amount of deviation away from the null or neutral position.

While I have shown and described a specific embodiment of this invention, further modifications and improvements will ocur to those skilled in the art. It is to be understood, therefore, that this invention is not limited to the particular form shown and I intend in the appended claims to cover all modifications which do not depart from the spirit and the scope of this invention.

What I claim is:

1. Apparatus of the class described comprising a frame; a sensitive instrument rotatably mounted on said frame and including electrically energizable means; electrical connection means between said frame and said instrument for energizing said energizable means, said connection means imparting a positive elastic restraint to rotation between said instrument and said frame; an inductive signal generator comprising a stator mounted on said frame, a rotor on said instrument and primary and secondary windings on said stator, said generator producing a signal voltage as a function of rotation between said instrument and said frame; means for applying an alternating current voltage to said primary windings of said signal generator; and means for imparting a negative elastic restraint to rotation between said instrument and said frame, said negative elastic restraint producing means comprising a capacitor connected to said secondary windings of said signal generator.

2. Apparatus of the class described comprising a frame; a sensitive instrument rotatably mounted on said frame and including electrically energizable means; electrical connection means between said frame and said instrument for energizing said energizable means, said connection means imparting a positive elastic restraint to rotation between said instrument and said frame; an inductive signal generator comprising a stator, a rotor, and primary and secondary windings on said stator, said generator producing a signal voltage as a function of rotation between said instrument and said frame; means for applying an alternating current voltage to said primary windings of said signal generator; and means for imparting a negative elastic restraint to rotation between said instrument and said frame, said negative elastic restraint producing means comprising capacitor means connected to said secondary windings of said signal generator.

3. Gyroscopic apparatus of the class described comprising a housing; a hollow hermetically sealed gimbal member rotatably mounted in said housing for limited rotation about an output axis; an electrically driven gyroscope in said gimbal having a spin axis normal to said output axis; viscous fluid in said housing supporting said gimbal in substantially neutral suspension; flexible connection means between said housing and said gimbal adapted to be connected to said gyroscope and to a source of voltage so as to energize said gyroscope, said flexible connection means imparting a positive elastic restraint to rotation between said gimbal member and said housing about said output axis; an inductive signal generator comprising a rotor member mounted on said gimbal member, a stator member mounted in said housing adjacent to said rotor member, and primary and secondary windings on said stator member; means for applying an alternating current voltage to said primary windings of said signal generator; and means for imparting a negative elastic restraint to rotation between said gimbal member and said housing about said output axis, said negative elastic restraint producing means comprising a capacitor connected to said secondary windings of said signal generator.

4. Gyroscopic apparatus of the class described comprising a housing; a hollow hermetically sealed gimbal member rotatably mounted in said housing for limited rotation about an output axis; a gyroscope in said gimbal having a spin axis normal to said output axis; viscous fluid in said housing supporting said gimbal in substantially neutral suspension; flexible connection means between said housing and said gimbal, said flexible connection means imparting a positive elastic restraint to rotation between said gimbal member and said housing about said output axis; an inductive signal generator comprising a rotor member, a stator member, and primary and secondary windings on said stator member; means for applying an alternating current voltage to said primary windings of said signal generator; and means for imparting a negative elastic restraint to rotation between said gimbal member and said housing about said output axis, said negative elastic restraint producing means comprising capacitor means connected to said secondary windings of said signal generator.

5. In electrical apparatus, a signal generator comprising primary and secondary windings and having a stator element and an armature element, said elements being relatively movable, means tending to restrain movement of said elements in a positive sense, means for connecting the primary winding of said generator to a suitable source of electrical energization, means for connecting the secondary winding to a suitable load, and capacitor means connected to said secondary winding, said capacitor means being of such value and so connected as to alter the phase relationship of the current generated in said secondary winding, when said primary winding is energized, to thereby produce a negative restraint to motion tending to offset the effect of said means tending to restrain movement in a positive sense.

6. In electrical apparatus, a signal generator comprising primary and secondary windings and having a stator element and an armature element, said elements being relatively movable, means tending to elastically restrain movement of said elements in a positive sense, means for connecting the primary winding of said generator to a suitable source of electrical energization, means for connecting the secondary winding to a suitable load, and capacitor means connected to said secondary winding, said capacitor means being of such value and so connected as to alter the phase relationship of the current generated in said secondary winding, when said primary winding is energized, to thereby produce a negative elastic restraint to motion tending to offset the effect of said means tending to elastically restrain movement in a positive sense.

7. Apparatus of the class described comprising a base member; a second member movably mounted on said base member; means connected to said members tending to elastically restrain in a positive sense relative movement between said members; an inductive device comprising armature means, stator means, and primary and secondary winding means on said stator means, said stator means being connected to one of said members and said armature means being connected to the other of said members; means for applying an alternating current to said primary winding means; and means for imparting a negative elastic restraint to said members so as to offset the effect of said positive elastic restraining means, said negative elastic restraining means including capacitive means connected to said secondary winding means.

References Cited in the file of this patent

UNITED STATES PATENTS

| | | |
|---|---|---|
| 2,488,734 | Mueller | Nov. 22, 1949 |
| 2,608,099 | Roush | Aug. 26, 1952 |
| 2,662,410 | Ballard et al. | Dec. 15, 1953 |
| 2,669,126 | Simmons et al. | Feb. 16, 1954 |
| 2,700,739 | Orlando | Jan. 25, 1955 |